United States Patent [19]

Calcinai

[11] Patent Number: 5,136,782
[45] Date of Patent: * Aug. 11, 1992

[54] APPLIANCE FOR SCRUB CLEARANCE, GRASS CUTTING OR THE LIKE, WITH DEVICES FOR LENGTHENING THE CUTTING LINE AND COUPLING DEVICES

[76] Inventor: Maria R. Calcinai, via Molino N.18-Montanino, Fraz.Com.Reggello, Firenze, Italy

[*] Notice: The portion of the term of this patent subsequent to Oct. 11, 2007 has been disclaimed.

[21] Appl. No.: 264,440

[22] Filed: Oct. 27, 1988

[30] Foreign Application Priority Data

Nov. 4, 1987 [IT] Italy .................. 9531 A/87
Mar. 30, 1988 [IT] Italy .......... 11589 A/88[U]

[51] Int. Cl.$^5$ ............. A01D 55/18; B26B 27/00
[52] U.S. Cl. ..................... 30/276; 30/347; 56/12.7
[58] Field of Search ........... 30/276, 347; 56/12.7

[56] References Cited

U.S. PATENT DOCUMENTS

| | | | |
|---|---|---|---|
| 4,097,991 | 7/1978 | Proulx | 30/276 |
| 4,107,901 | 8/1978 | Moore | 56/17.5 |
| 4,145,809 | 2/1979 | Proulx | 30/276 |
| 4,151,646 | 5/1979 | Lane | 30/276 |
| 4,476,632 | 10/1984 | Proulx | 30/276 |
| 4,599,796 | 7/1986 | Baba | 30/276 |
| 4,640,084 | 2/1987 | Baba | 30/276 X |

FOREIGN PATENT DOCUMENTS

| | | | |
|---|---|---|---|
| 6621627 | 10/1978 | Taiwan | . |
| 6820990 | 12/1979 | Taiwan | . |
| 6321237 | 4/1984 | Taiwan | . |

*Primary Examiner*—Douglas D. Watts
*Attorney, Agent, or Firm*—McGlew & Tuttle

[57] ABSTRACT

Appliance for scrub clearance, grass cutting or the like, with multiple lines as cutting elements, with a casing in two parts (51, 53) coupled together and containing at least one spool on which said lines are wound, comprising: devices (77A, 77B) for coupling and decoupling of said parts (51, 53); resilient devices (75) designed to maintain said coupling devices in the hold position; and, of one piece with one (53) of the said two parts, devices for effecting connection (80) between said part and said spool (81), whilst the other (51) of the said parts exhibits outlet bushes for the ends of the lines (F); an intermediate bowl-shaped component (99) designed to be coupled to the rotary drive hub (95); and quick-release coupling devices (100,112) for coupling up said intermediate component (99) and the casing (51, 53) of the appliance, to ensure that the appliance is firmly supported by and rotated with the intermediate component (99).

9 Claims, 4 Drawing Sheets

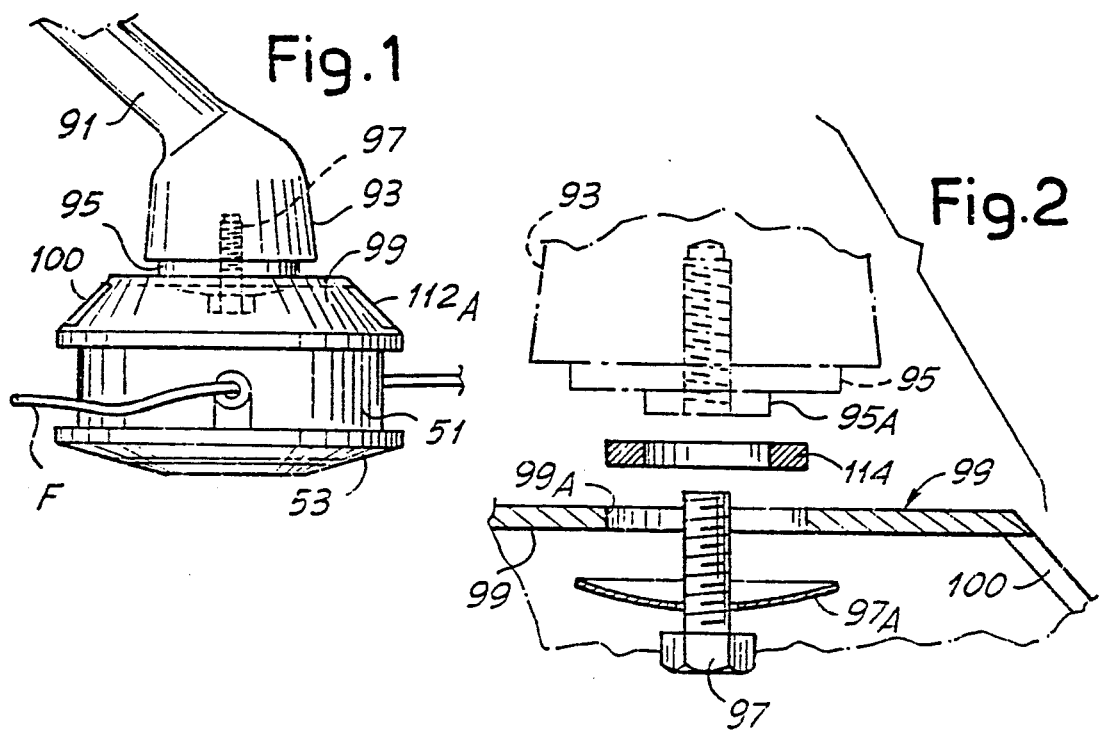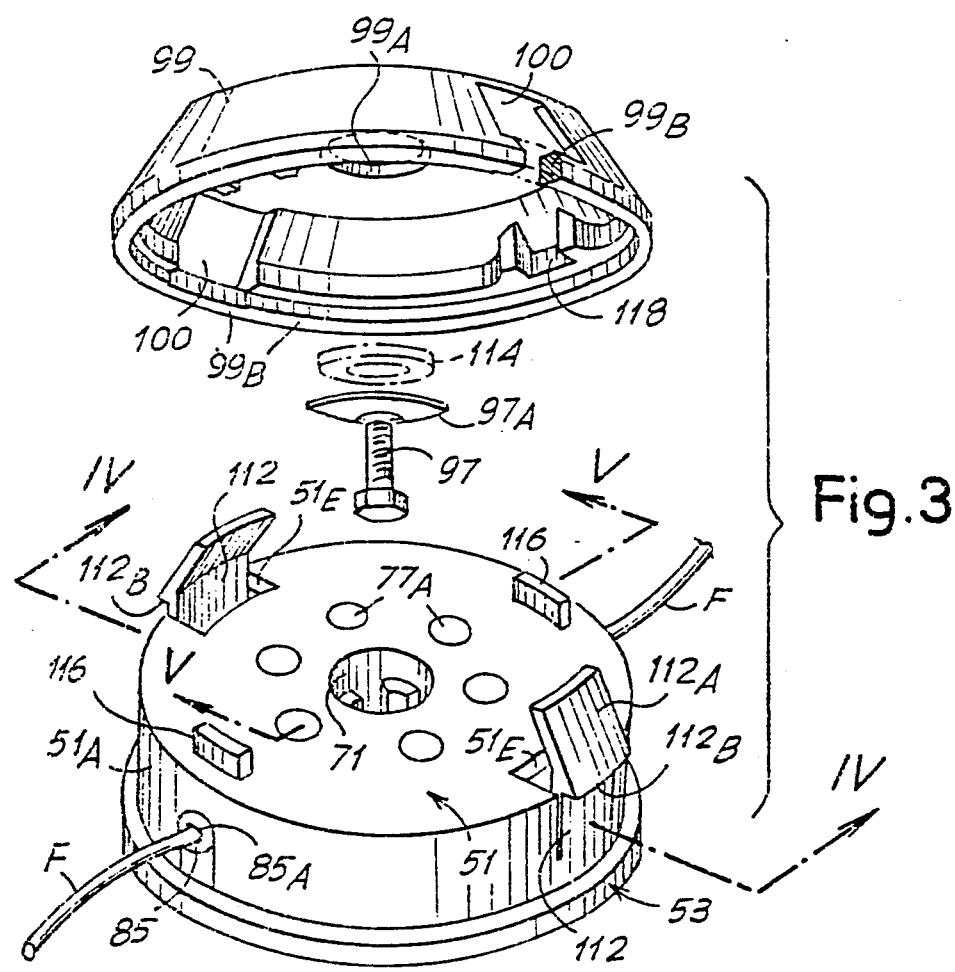

APPLIANCE FOR SCRUB CLEARANCE, GRASS CUTTING OR THE LIKE, WITH DEVICES FOR LENGTHENING THE CUTTING LINE AND COUPLING DEVICES

The invention concerns an appliance for scrub clearance, grass cutting and the like, with multiple lines as cutting elements, comprising a casing in two parts coupled together and, inside said hosing, at least one spool on which said lines are wound, it being possible to increase the length of said lines in terms of the type of vegetation to be cut or to restore said lines to their previous length following operational wear.

In appliances of this kind, regulating and/or restoring the length of the cutting lines is often a long and tedious operation. In some types of known appliances, in fact, the casing in which the spools with the lines are housed has to be unscrewed and partially opened, each line lengthened by the action of pulling on its free end, and the casing closed again. Apart from the obvious disadvantage of having to partially open the casing housing the spools of line, the lengths of cutting line obtained in this way are never completely uniform.

Appliances also exist which have inside them multiple spools of cutting line, four for example, each of which is attached to resilient locking means. To lengthen each of the lines, an unlocking means is operated (usually a push-button), serving the line in question, and this causes release of the resilient locking means and enables the line to be unwound by pulling on its free end. In appliances of this type, as many lengthening operations as there are cutting lines are required. Moreover, in this case also, the different lines are not lengthened to the same uniform length. Furthermore, if multiple spools of cutting line are provided that are positioned off-center in relation to the axis of rotation of the casing, and if the amount of line wound on the different spools is not uniform, the appliance will be dynamically unbalanced and may start to vibrate when operated.

Grass-cutting, scrub-clearance and similar appliances are usually coupled at the end of a shaft handle to a hub that generally rotates on an axis at an obtuse angle to the axis of the shaft. The hub is generally designed with a series of stepped circles enabling the location of the appliance to be rotated; screw-type means are used for affixture, which means can be in the form of a threaded pin on the hub cooperating with a fastening nut on the appliance, or of a threaded hole for receiving a bolt. In any case, the method of affixture employed requires space in the center of the appliance for the nut-and-bolt type fastening means; this places a limit on the types of appliance that can be affixed to a shaft handle of the aforementioned type. Scrub-clearing, grass-cutting and similar appliances also present problems in regard to the provision of affixture openings in the center of the appliance.

The subject of the invention is an appliance of the type described above which does not suffer from the aforesaid disadvantages and enables, in particular, the cutting lines to be unwound with ease and dispatch, with the lines being unwound to a uniform length, and, furthermore, which does not impose any limitations on the type of grass-cutting, scrub-clearing or similar appliance that can be affixed to a hub, itself affixed to a shaft handle of the type described above. Additionally, it is a very simple operation to engage the appliance with and releases it from the hub of the drive shaft.

The nature of these and other purposes and advantages will be clearly seen from what follows.

In brief, the appliance according to the invention comprises: means for coupling and decoupling said two casing parts; resilient means designed to maintain said coupling means in the coupling position; and, connecting means forming one piece with one of said two casing parts, means for effecting connection between said one casing part and said spool while the other one of said parts provides outlet bushes for the ends of the lines.

In effect, said resilient means urge said casing parts toward each other in the axial direction, the movement of said two casing parts apart from each other in the axial direction causing the disengagement of said coupling and uncoupling devices. With this system it is possible for one of the two parts of the head to be held steady whilst the other is moved away in the axial direction, the parts thereby being disengaged, and for the line then to be unwound from the spool or spools by relative rotation of the two casing parts in relation to each other. In this way, regulating the length of line is simple and rapid. When the spool, or one of the spools, is empty it can be speedily replaced by disengagement of the two casing parts forming the head In one possible embodiment, one of said casing parts comprises a tubular wall forming a grooved profile for coupling on the spool or spools of line, the spool or spools of line being set firmly in said tubular wall as a result of having complementary grooved profiles for engagement with said tubular wall; said casing part is also equipped with a series of axially extending pins in a frontal coupling device designed to engage in complementary sockets in the other of the said casing parts. Said resilient means can also be housed in the tubular wall, as can means for coupling together the two parts forming the casing of the appliance. Said coupling means are in this way all housed in the head, and constitute no obstruction between the head and the surface (the ground, for example) to be worked over.

An intermediate component is provided for coupling grass-cutting, scrub-clearance and similar appliances to the rotary hub which is generally coupled to the end of a shaft handle, such intermediate component usually being bowl-shaped and being designed to be coupled to the rotary hub by means of quick-release coupling means between said intermediate component and the casing of the appliance, to ensure that the appliance is firmly supported by and is rotated with the intermediate component.

The bowl-shaped intermediate component is provided with coupling slots, and the appliance with resilient members engaging in said slots; quick-release coupling is effected with the use of engaging pieces, release being obtained by means of pressure on the resilient members.

The intermediate bowl-shaped component can have an aperture for fitting onto a stepped pickup provided—in the usual manner—on the rotary hub, the intermediate component being firmly affixed at a location opposite this pickup by screw means to the hub. A reducing ring can be used to function between the aperture in the bowl-shaped intermediate component and the stepped pickup, if the latter has a reduced dimension.

Interengaging profiles can also be provided in the intermediate component and the casing of the appliance, respectively, for starting up rotation of the appliance.

The drawings illustrate one, non-limiting, embodiment of the invention. In these drawings:

FIG. 1 represents a side elevation of the appliance coupled to the end of a shaft;

FIG. 2, represents a part-sectional, exploded view of the intermediate component and the components operating in conjunction therewith;

FIG. 3 represents a partly exploded view;

Figure 4:
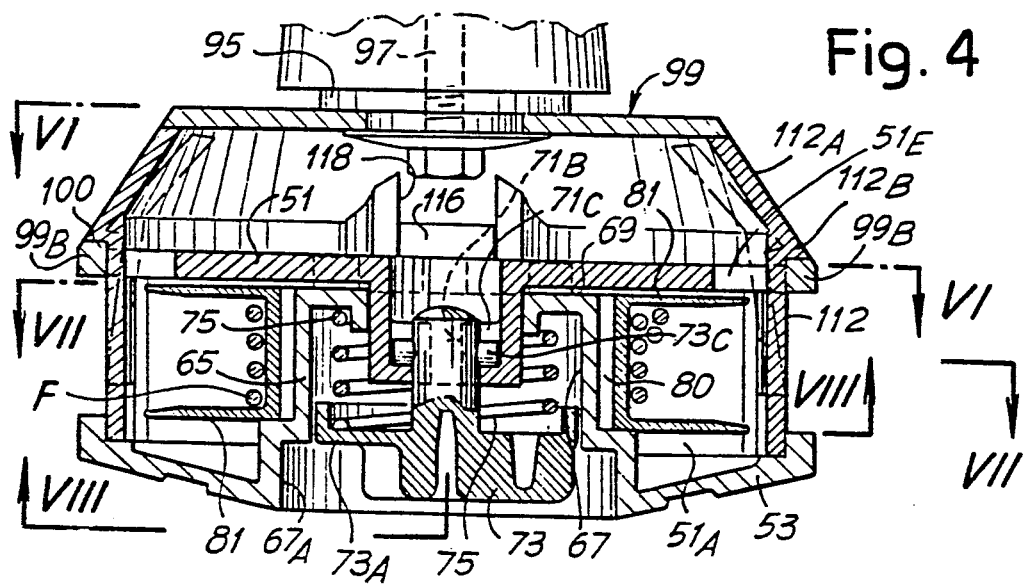
FIGS 4 and 5 illustrate a grass cutting appliance using a line, fitted with coupling devices and taken along section lines IV—IV and V—V in FIG. 3 respectively.
Figure 5:
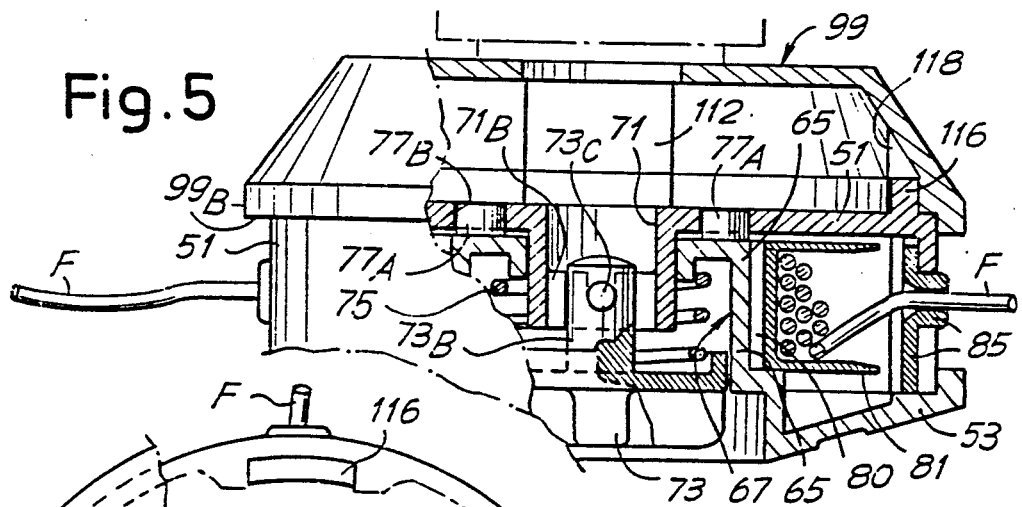
Figure 6:
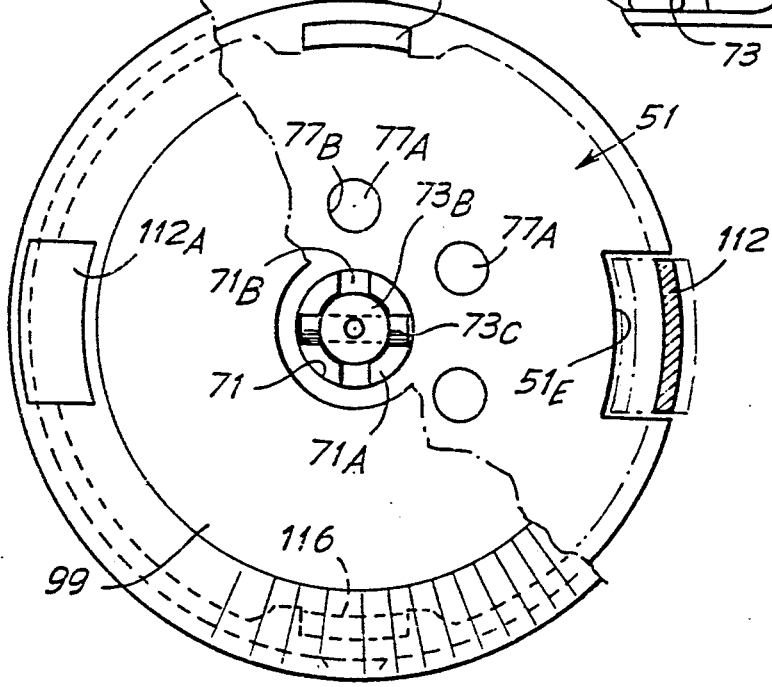
FIGS. 6, 7 and 8 represent sectional views taken along lines VI—VI, VII—VII and VIII—VIII, in FIG. 4, respectively.
Figure 7:
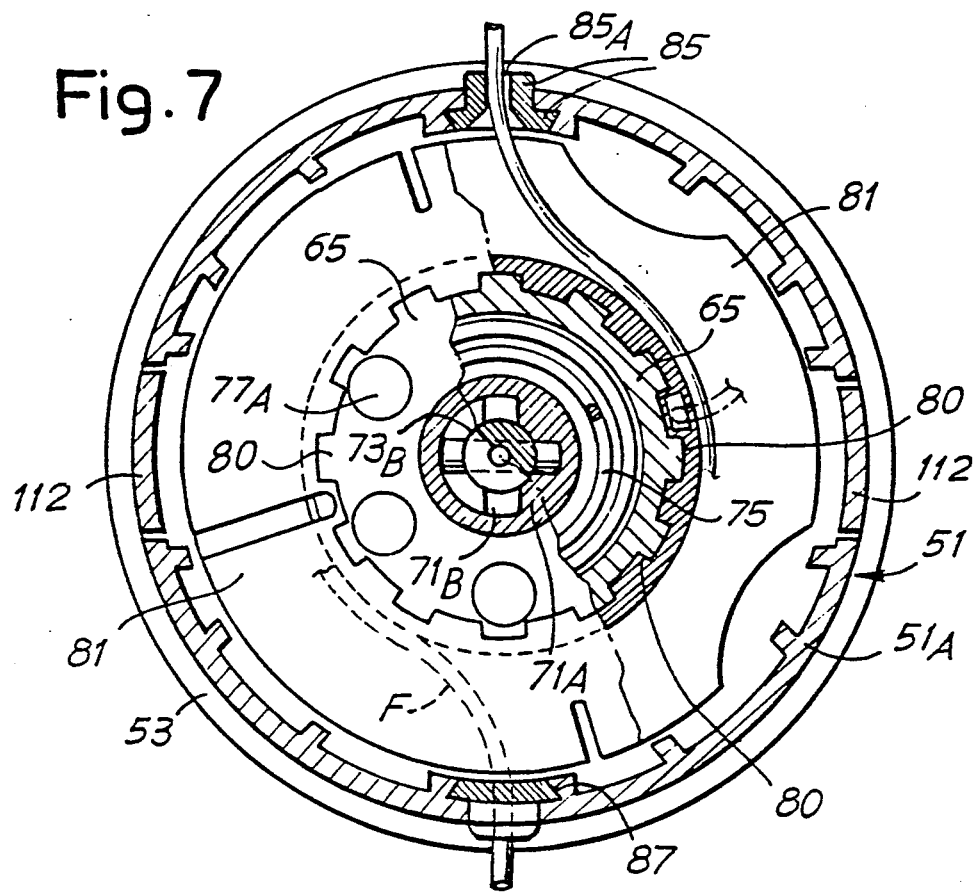
Figure 8:
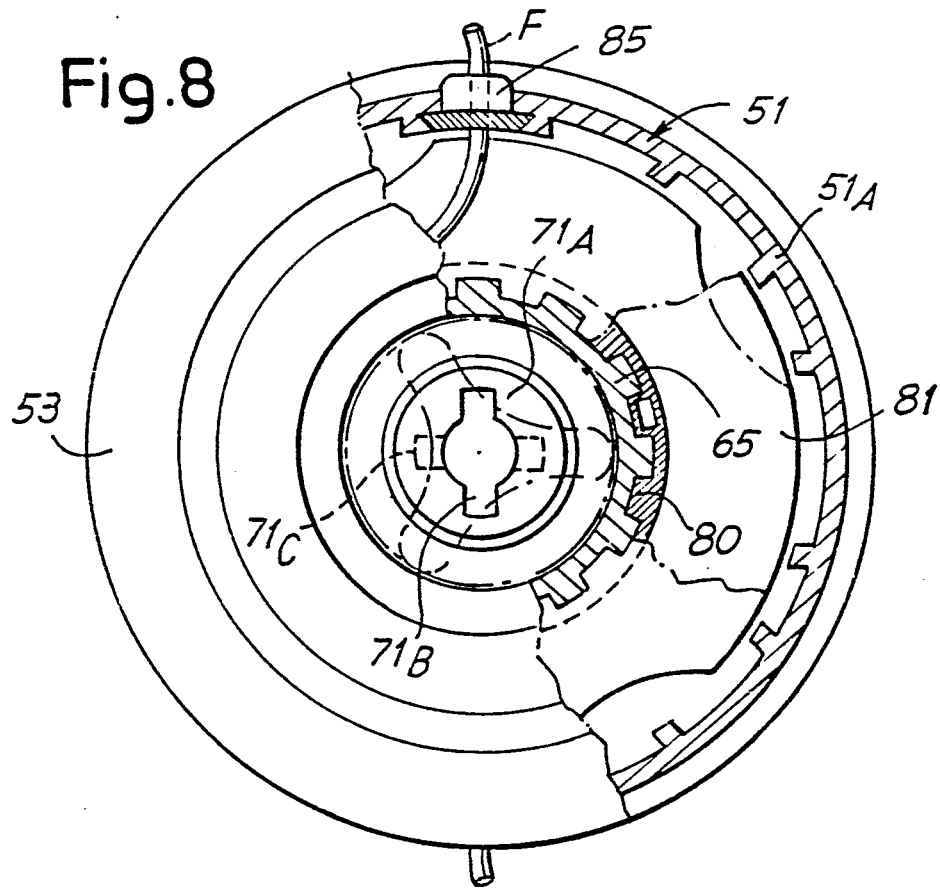
Figure 9:
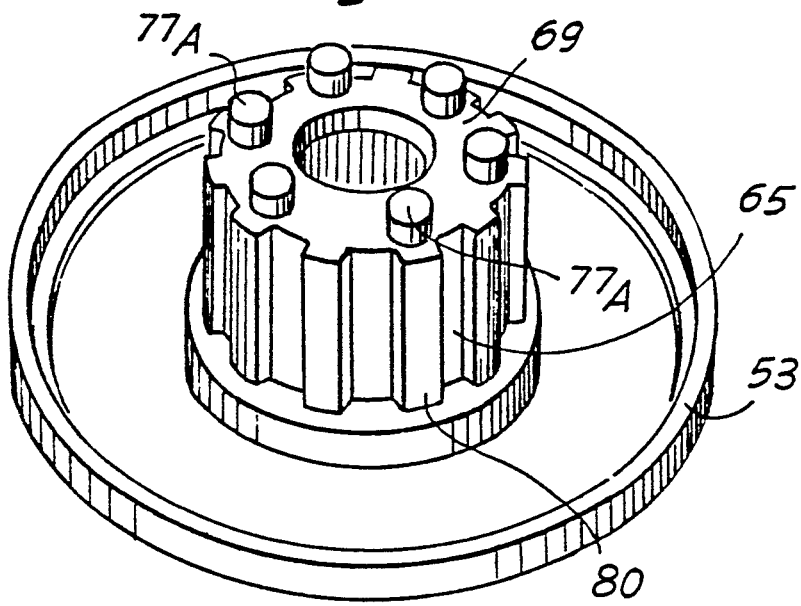
FIG. 9 shows one of the casing parts in perspective.
Figure 10:
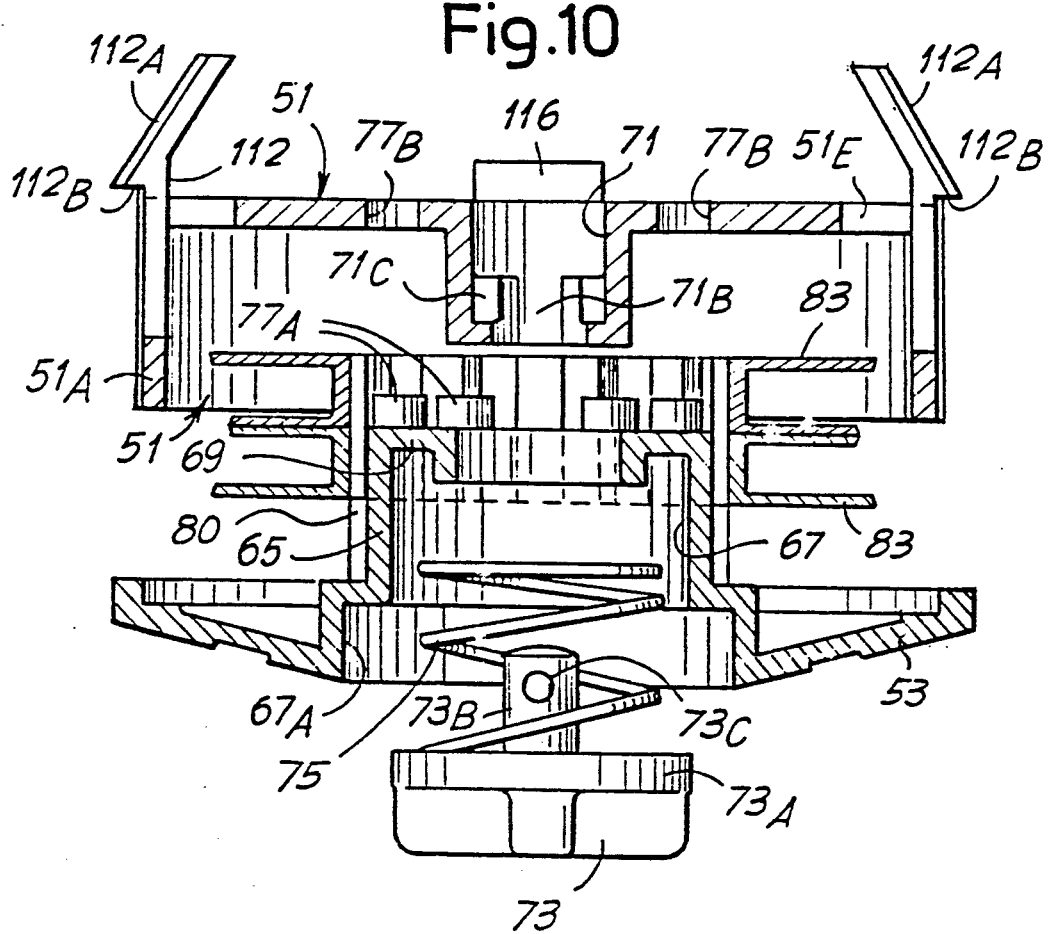
FIG. 10 illustrates the grass cutter appliance shown in sectional view in FIG. 4 with the component parts all disassembled.

As shown by the drawing, the appliance head comprises a casing formed of two parts 51 and 53 coupled together in such a manner that they can slide over each other in the axial direction and rotate.

The part 53 forms, with a cylindrical wall 65, a seating 67 that is coaxial with the head and is closed at the inner end by an end wall 69 with a hole in the center for the sliding insertion of a corresponding cylindrical wall 71 of part 51, the walls together forming a housing seating for a bayonet joint. The seating 67 houses a plug component 73 and a compression spring 75 reacting between the end wall 69 and a flange 73A of the plug 73. To create the bayonet joint, the plug 73 defines a shaft 73B with two opposed radial pins 73C while a thickening 71A in the cylindrical wall 71 forms an axial guide seating for the shaft 73B, with two grooves 71B for receipt of the pins 73C and two seats 71C in which the pins 73C are housed following rotation of the plug 73 through 90 (insert degrees symbol) after the pins 73C have slid through the grooves 71B. When the pins 73C are engaged in the seats 71C of the wall 71 formed by the part 51, the two parts 51 and 53 are urged towards each other by the spring 75 and maintained i the closed position. It is to be noted that the plug 73 is fully recessed in the seating 67 of the part 53, and access enabling manipulation is afforded by an enlargement 67A of said seating 67.

The parts 51 and 53 form an axially front toothed coupling, comprising, in the example shown, pins 77A protruding axially from the end wall 69 and axially extending holes 77B in the part 51. As a result, when the plug 73 forms a bayonet joint with the wall 71, the two parts 51, 53 must be parted in the axial direction—overcoming the force of the spring 75—for the two parts 51, 53 to be released and rotated in relation to each other.

The cylindrical wall 65 is provided on the outside with a grooved profile 80 coupling with a complementary grooved profile on a spool 81 or a pair of spools 81, 83 on which the cutting lines F are wound. Two lines F can be wound on the or each spool; the inside ends of the lines F are held fast in seatings in the spools, while the outside ends of the lines F protrude from the casing formed by the two parts 51, 53 through apertures 85A in bushes 85 housed in seatings 87 on the shell 51A of the part 51 of the head. To unwind the lines F, and so lengthen them, all that is required is to grip the two parts, 51, 53 and move them apart from each other in the axial direction against the force of the spring 75 compressing the spring so as to disengage the pin end socket 77A, 77B; thereupon, keeping the two parts 51, 53 axially apart, it is possible to rotate them in relation to each other and hence, as a result of the grooved profile coupling between the part 53 and the spools 81, 83, cause the latter to rotate in relation to the part 51 housing the bushes 85, thus causing the lines F to unwind from the spools through the line receiving apertures 85A.

Using the method described, it is possible to unwind, in a single operation, an equal length of line with respect to all the lines F in use. It is not necessary to pull out the line F manually through the apertures in the bushes 85. In effect, once the line F has been slackened following rotation of the two parts 51, 53 in relation to each other, the subsequent rotation of the casing 51, 53 when the appliance is in operation causes the slackened lines F to protrude as a result of centrifugal force.

The bushes 85 are elongate in shape and are housed in the corresponding elongate seatings 87 on the shell 51A of the part 51 of the head. As a result, even if the seating housing the bushes 85 becomes worn, and there is some play between seating and bush, the latter will not become dislodged from its respective seating when the two parts 51, 53 are moved axially apart to permit the line to be unwound, but will merely slide within the seating, being pushed back to its original position when the two parts 51, 53 are recoupled together. Loss of any of the bushes is thereby avoided, as is the possibility of the dangerous consequences that could result if a bush 85 were to be dislodged from its seating 87, since the bush could then be projected outwards by centrifugal force on starting the operational rotation.

In order to change the spools 81, 83 or any others, the plug 75 is freed by pressing it axially against the action of the spring 75 so as to disengage the pins 73C from the seatings 71C, then turn and withdraw the plug causing the pins 73C to slide along the grooves 71B, permitting the two parts 51, 53 to be moved axially apart from each other, and finally to recouple them by carrying out the same operations in reverse order.

Different numbers of spools can be set into the grooved profile 80 of the cylindrical wall 65, for example, a single, taller spool, or two or three separate spools. Spools can also be used with a single line winding or with windings comprising more than two lines, for example, four lines.

A scrub-clearance and grass-cutting appliance of the kind described, housed inside the casing formed by the two parts 51, 53, can be coupled to a rotary drive hub in the manner described below.

The numeral 91 in FIGS. 1, 2 and 4 illustrates in summary form the shaft handle housing inside a drive shaft extending by means of an articulated joint to the head 93 of the shaft handle. A hub 95 protrudes from the head and is rotated by a motor carried by the shaft handle 91, on an axis that is inclined in relation to that of the shaft handle. In particular, the hub 95 is in the form of a stepped circular component 95A serving too center and position the appliance to be affixed thereto, which appliance must for this purpose have an aperture with circular dimensions which are no smaller than those of the cylindrical wall of the stepped component 95A. The method of affixture is through a screw means, represented in the drawings by a bolt 97 for receipt in an axially positioned threaded hole in the hub 95, thereby to couple to said hub an intermediate component 99 with an aperture for fitting over the stepped component 95A. In other possible embodiments, the hub has a threaded bolt for coupling the same wall with the aperture, by means of a nut.

The grass-cutting, scrub-clearance or similar appliance is housed inside the two parts 51, 53 described above. The appliance needs to be affixed to the hub 95, to which it is coupled through the interpositioning of the said intermediate component 99, component 99 is formed with a central hole 99A whose diameter is equal to or greater than that of the cylindrical wall of the stepped component 95A in the latter case recourse must be made to a reducing element. The intermediate component 99 also has a rim 99B that can be employed as a support for the casing of the appliance. In all case the intermediate component 99 has slots 100 positioned laterally in uniform arrangement round the axis of the component 99, for example, two opposed slots 100 in the sloping wall of the bowl-shaped intermediate component 99.

Resilient members 112 extend from the shell 51A of the part 51 of the appliance at locations corresponding to the slot locations and comprise engaging pieces 112A and retaining edges 112B. Strain relieving slots 51E extend into the part 51, on each side of each member 112 adjacent to the location of its extension from the shell to enable the members 112 to be resiliently displaced by flexure. The resilient members 112 are designed to be inserted into the slots 100 with a snap action as a result of their progressive flexure caused by sliding engagement with the intermediate component 29 when the intermediate component and the part 51 are urged relatively together in an axial direction. Catch retention is effected between the retaining edges 112B and the rims 100A of the slots 100 closest to the edge 99B.

The bowl-shaped intermediate component 99 is affixed by means of the screw means 97 already indicated (or other means) to the stepped component 95A, the thickness of the said intermediate component 99 in the area of the hole 99A being not less than the height of the stepped component 95A. If the diameter of the cylindrical wall of the stepped circular component 95A is smaller than that of the hole 99A, a reducing ring element 114 can be employed (FIG. 2) having an external diameter which corresponds with that of the hole 99A and an internal diameter which corresponds with that of the cylindrical wall of the stepped component 95A, with one or other of the rings being used in conjunction with the intermediate component 99 on the stepped component 95A. As a rule, one ring alone 114 is sufficient to compensate for the difference between two standardized diameters of the types of hub that are most widely sold.

The bowl-shaped intermediate component 99 is clamped to the 15 hub 95 of the shaft handle 91 by the assembly of bolt 97 and a resilient spacing plate 97A. The appliance to be affixed and operated is coupled to the bowl-shaped component 99 by its own resilient members 112, the engaging pieces 112 thereon sliding over the edge 99B inside the component 99 until they engage the edges 112B on the rims 100A of the slots. To release the appliance, all that is needed is to press down radially on the pieces 112A projecting in alignment with the slots 100, thereby flexing the pieces 112A inwards causing the edges 112B to be released from the rims 100A. It is advantageous, f or this operation, for the attachments 112 and the slots 100 to be two in number and diametrically opposed.

Direct use can be made of the attachment 112 for transmitting the driving force to the appliance when starting rotation of the appliance but suitable axially engagable parts can also be provided such as attachments protruding from the casing 51, 53 of the appliance indicated by the numeral 116 in the drawings, to operate in conjunction with correspondingly shaped elements 118 inside the bowl-shaped intermediate component 99. Coupling arrangements for start-up require the axial positioning of the casing parts 51, 53 of the appliance by means of the resilient attachments 112 for engagement in the slots 100, possibly also the use of guide and connecting pieces for angular positioning of the said resilient attachments 112 in correspondence with the slots 100 and/or of guides for positioning the attachments 116 with respect to the profiles 118.

Thus, for this coupling system, the appliance requires only the resilient attachments 112, which are on the periphery thereof and, possibly, the attachments for engagement and start-up indicated by 116, but no other space-consuming coupling elements are necessary, especially in the central, that is to say, axial area of the appliance. Accordingly, space is available for various different types of appliance to be coupled to the shaft with the interposition of the component 99.

I claim:

1. Appliance for scrub clearance, grass cutting or the like, with multiple lines as cutting elements, and including a housing casing in two parts, coupled together for rotation together about a common axis and, inside said housing casing, at least one spool on which said lines are wound, lengths of said lines being adjustable according to the type of vegetation to be cut or following operational wear, which appliance comprises: means (77A, 77B) for releasably coupling said two housing casing parts (51,53) for said rotation together; resilient biasing means (75) arranged to urge said housing casing parts (51,53) each other in the axial direction, into the coupling position and to maintain said releasable coupling means in the coupling position separation of said two housing casing parts in the axial direction releasing said releasable coupling means (77A, 77B); and, connecting means (80) formed in one piece with one (53) of said two housing casing parts (51, 53), for effecting connection (80) between said one housing casing part (53) and said spool (81; 83), and the other one (51) of said housing casing parts (53, 51) having outlet bushes (85) for receiving respective ends of the lines (F).

2. Appliance in accordance with claim 1, in which the connecting means comprises a tubular wall (65) having an axially grooved profile (80) said at least one spool having a complementary grooved profile for rotationally fixed engagement with said tubular wall; and said one housing casing part (53) being equipped with a series of axially protruding pins of (77A) of a frontal coupling device, engageable in complementary holes (77B) in the other housing casing part (51).

3. Appliance in accordance with claim 2, in which said resilient biasing means (75) comprise a compression spring (75) surrounded by said tubular wall (65).

4. Appliance in accordance with claim 3, in which plug-in means (73) are surrounded by the tubular wall (65) and define with the casing part 51 a bayonet connection providing mutual engagement of the two housing casing parts (51,53).

5. Appliance for scrub clearance, grass cutting or the like, with multiple lines as cutting elements, and including a housing casing in two parts, coupled together for rotation together about a common axis and, inside said housing casing, at least one spool on which said lines are wound, lengths of said lines being adjustable according to the type of vegetation to be cut or following operational wear, which appliance comprises: means (77A, 77B) for releasably coupling said two housing casing parts (51, 53) for said rotation together; resilient biasing means (75) arranged to maintain said releasable coupling means in the coupling position; connecting means (80) formed in one piece with one (53) of said two housing casing parts (51, 53), for effecting connection (80) between said one housing casing part (53) and said spool (81; 83), the other one (51) of said housing casing parts (53, 51) having outlet bushes (85) for receiving respective ends of the lines (F); a bowl-shaped intermediate component (99) provided for engagement with a rotary hub (95) fitted at the end of a shaft handle (91) and quick-release coupling means (100, 112) provided on said intermediate component (99) and a housing casing part (51) of the appliance, to ensure that the appliance is firmly supported by and rotated with the intermediate component (99).

6. Appliance in accordance with claim 5, in which the bowl-shaped intermediate component (99) is formed with coupling slots (100) and the appliance is formed with resilient members (112) having engaging pieces (112A) engagable in said slots with a snap action; quick release of the bowl-shaped intermediate component from the appliance being and release being obtainable by means of pressure on the resilient members (112) flexing the resilient members and thereby forcing the engaging pieces out from the slots.

7. Appliance in accordance with claim 5, in which the bowl-shaped intermediate component (99) has an aperture (99A) for fitting onto a conventional stepped pickup (95A) on a rotary hub (95A), the intermediate component (99) being firmly affixed to the hub (95) at a location opposite the pickup (95A) by screw means (97).

8. Appliance in accordance with claim 7, in which a reducing ring (114) is provided for insertion between the aperture (99A) in the bowl-shaped intermediary component (99) and the stepped pickup (95A), if the latter has a dimension substantially smaller than the dimension of the aperture.

9. Appliance in accordance with claim 5, in which interengagable profiles (116; 118) are provided on the intermediate component (99) and on the casing of the appliance for engagement when starting up rotation of the appliance.

* * * * *